US011188365B2

(12) United States Patent
Tsirkin et al.

(10) Patent No.: US 11,188,365 B2
(45) Date of Patent: Nov. 30, 2021

(54) MEMORY OVERCOMMIT BY SPECULATIVE FAULT

(71) Applicant: Red Hat, Inc., Raleigh, NC (US)

(72) Inventors: Michael Tsirkin, Westford, MA (US); Henri van Riel, Westford, MA (US)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 15/363,865

(22) Filed: Nov. 29, 2016

(65) Prior Publication Data
US 2018/0150232 A1 May 31, 2018

(51) Int. Cl.
*G06F 3/06* (2006.01)
*G06F 9/455* (2018.01)
*G06F 12/109* (2016.01)

(52) U.S. Cl.
CPC ........ *G06F 9/45558* (2013.01); *G06F 12/109* (2013.01); *G06F 2009/45583* (2013.01); *G06F 2212/151* (2013.01); *G06F 2212/651* (2013.01)

(58) Field of Classification Search
CPC .... G06F 3/06; G06F 12/1027; G06F 12/1009; G06F 9/455; G06F 9/45558; G06F 2009/45583; G06F 2212/651; G06F 2212/151; G06F 12/109
USPC ........................................................... 711/6
See application file for complete search history.

(56) References Cited

U.S. PATENT DOCUMENTS

| 8,296,775 | B2 * | 10/2012 | Thornton ............ G06F 9/45533 712/228 |
| 9,110,806 | B2 | 8/2015 | Sharma et al. |
| 9,135,038 | B1 * | 9/2015 | Uchronski .......... G06F 9/45533 |
| 9,229,881 | B2 | 1/2016 | Epstein |
| 9,354,906 | B1 | 5/2016 | Uchronski et al. |
| 2009/0144510 | A1 * | 6/2009 | Wibling ................ G06F 9/5016 711/147 |
| 2010/0241785 | A1 * | 9/2010 | Chen ................... G06F 12/1036 711/6 |
| 2011/0161620 | A1 | 6/2011 | Kaminski et al. |
| 2014/0075127 | A1 * | 3/2014 | Garthwaite ........... G06F 9/5016 711/147 |
| 2015/0199209 | A1 | 7/2015 | Tsirkin |

OTHER PUBLICATIONS

Wan Jian, Du Wei, Jiang Cong-Feng, Xu Xiang-Hua, *Overcommitting Memory by Initiative Share from KVM Guests*, 2014, Department of Computer Science, Hangzhou Dianzi University, Hangzhou, 310018, http://www.sersc.org/journals/IJGDC/vol7_no4/7.pdf.
*SWE3015: Operating System Project—Page Fault Handler*, http://csl.skku.edu/uploads/SWE3015S14/swe3015s14reclaim.pdf.

(Continued)

*Primary Examiner* — Daniel D Tsui
*Assistant Examiner* — Zubair Ahmed
(74) *Attorney, Agent, or Firm* — Haynes and Boone, LLP (57) ABSTRACT

An example method of allocating memory pages for a guest includes receiving, by a hypervisor, a request to allocate a plurality of guest memory pages for a guest running on a virtual machine. The virtual machine and the hypervisor run on a host machine. The method also includes in response to the request: (i) allocating, by the hypervisor, a plurality of host memory pages, and (ii) mapping the plurality of guest memory pages to the plurality of host memory pages.

19 Claims, 6 Drawing Sheets

(56) References Cited

OTHER PUBLICATIONS

Ishan Banerjee, Fei Guo, Kiran Tati, Rajesh Venkatasubramanian, *Memory Overcommitment in the ESX Server*, 2013, VMware, Inc., https://labs.vmware.com/vmtj/memory-overcommitment-in-the-esx-server.

Nadav Amit, Dan Tsafrir, Assaf Schuster, Vswapper: *A Memory Swapper for Virtualized Environments*, Mar. 1-4, 2014, Technion—Israel Institute of Technology, http://www.cs.technion.ac.il/~dan/papers/vswapper-asplos-2014.pdf.

John Savill, *Q. I Heard that VMware ESX Allows you to Overcommit Memory, Which Means it Pages out the Memory of guests to a file, Giving very Poor Performance. Is this True?*, Jul. 29, 2009, http://windowsitpro.com/systems-management/q-i-heard-vmware-esx-allows-you-overcommit-memory-which-means-it-pages-out-memory.

* cited by examiner

MEMORY OVERCOMMIT BY SPECULATIVE FAULT

FIELD OF DISCLOSURE

The present disclosure generally relates to virtualization, and more particularly to managing memory allocated to a guest.

BACKGROUND

A virtual machine (VM) is a portion of software that, when executed on appropriate hardware, creates an environment allowing the virtualization of an actual physical computer system. Each VM may function as a self-contained platform, running its own operating system (OS) and software applications (processes). A host machine (e.g., computer or server) is typically enabled to simultaneously run one or more VMs, where each VM may be used by a local or remote client. The host machine allocates a certain amount of the host's resources to each of the VMs. Each VM may use the allocated resources to execute applications, including OSs known as guests or guest OSs. The hypervisor virtualizes the underlying hardware of the host machine or emulates hardware devices, making the use of the VM transparent to the guest OS or the remote client that uses the VM. Typically, a hypervisor manages allocation and virtualization of computer resources and performs context switching, as may be necessary, to cycle between various VMs.

BRIEF SUMMARY

Methods, systems, and techniques for allocating memory pages for a guest are provided.

An example method of allocating memory pages for a guest includes receiving, by a hypervisor, a request to allocate a plurality of guest memory pages for a guest running on a virtual machine. The virtual machine and the hypervisor run on a host machine. The method also includes in response to the request, allocating, by the hypervisor, a plurality of host memory pages and mapping the plurality of guest memory pages to the plurality of host memory pages.

An example system for allocating memory pages for a guest includes an input/output (I/O) module that receives a list of guest memory addresses from a guest running on a virtual machine. The guest memory addresses included in the list is part of guest memory allocated to the guest. The system also includes a set of host page tables storing a plurality of page table entries. Each page table entry stores one or more mappings of a guest memory address to host physical memory. The system further includes a memory manager that manages the set of host page tables, allocates a plurality of host memory pages, and maps the guest memory addresses included in the list to the plurality of host memory pages. The plurality of host memory pages is part of the host memory.

According to another example, a machine-readable medium comprising a plurality of machine-readable instructions that when executed by one or more processors are adapted to cause the one or more processors to perform a method including: receiving, by a hypervisor, a request to allocate a plurality of guest addresses for a guest running on a virtual machine, the virtual machine and the hypervisor running on a host machine; and in response to the request: (i) allocating, by the hypervisor, a plurality of host memory pages; and (ii) mapping the plurality of guest addresses to the plurality of host memory pages.

BRIEF DESCRIPTION OF THE DRAWINGS

The accompanying drawings, which form a part of the specification, illustrate examples of the disclosure and together with the description, further serve to explain the principles of the examples. In the drawings, like reference numbers may indicate identical or functionally similar elements. The drawing in which an element first appears is generally indicated by the left-most digit in the corresponding reference number.

Examples of the present disclosure and their advantages are best understood by referring to the detailed description that follows.

DETAILED DESCRIPTION

It is to be understood that the following disclosure provides many different examples, or examples, for implementing different features of the present disclosure. Some examples may be practiced without some or all of these specific details. Specific examples of components, modules, and arrangements are described below to simplify the present disclosure. These are, of course, merely examples and are not intended to be limiting. Additionally, examples provided in the present disclosure may be combined.

A guest may attempt to access a memory page, resulting in a page fault. For example, memory overcommit (or overcommitment) is a hypervisor feature that allows a virtual machine to use more memory space than the physical host machine has available. An example of a memory overcommit solution is hypervisor swap or kernel same memory merging (KSM), which unmaps memory from the guest, or alternatively write-protects the memory. In this example, a page fault occurs when the guest later attempts to write into this memory, causing an exit to the hypervisor. In another example, the guest may attempt to read data from a guest memory page that is not mapped to host memory, resulting in a page fault and an exit to the hypervisor. In response to a page fault, the hypervisor may allocate a free host memory page and map a guest memory page to the free host memory page.

A problem may arise if the guest accesses to guest memory result in a high number of page faults because this may result in a high number of exits to the hypervisor. This may occur, for example, if the guest memory usage changes drastically, causing multiple page faults. In some examples, exiting per page may take seconds, even on a fast host machine. Accordingly, exits to the hypervisor and the handling of multiple page faults may be time consuming.

A possible solution for reducing the number of exits to the hypervisor may include enlarging the size of the memory pages. Some modern processors support different memory page sizes. This solution, however, may depend on the allocation and workload of the guest. For example, some memory allocators (e.g., hypervisor) may be structured to allocate memory pages of a particular size (e.g., 4 KB), and some memory consumers (e.g., guest or applications) may be structured to work with memory pages of a particular size (e.g., 4 KB). Accordingly, in some examples, it may not be possible to enlarge the size of the memory pages without dealing with other complications.

Another possible solution for reducing the number of exits to the hypervisor may include enlarging the size of the page tables. If a new program is running on the virtual machine, it may be desirable for the hypervisor to allocate a large number of memory pages for this new program. These memory pages, however, may not have similar characteristics and accordingly may be placed in different page tables. For example, the memory in the system may be divided into several memory zones with different characteristics. A memory zone may have low physical addresses and be feasible for direct memory access (DMA) by certain devices and another memory zone may be associated with particular bits corresponding to particular sockets. Accordingly, these enlarged page tables may have a large number of empty entries.

It may be desirable to speed up the memory allocation for the guest and overcome the above disadvantages. A solution for reducing the number of exits to the hypervisor and to speed up memory allocation on the hypervisor may leverage the guest's knowledge of which memory pages it will access before the guest actually accesses these memory pages. For example, when the guest allocates memory pages, it selects a guest memory address to use for a memory page and puts this guest memory address into the guest's set of page tables within the guest. The guest may continue to build this list of guest memory pages, and before accessing them the guest may send this list to the hypervisor for allocation and mapping. The hypervisor receives this list of guest memory pages, identifies free host memory pages that can be used to back up the guest memory pages included in the list, and maps the guest memory pages to the host memory pages. After the guest memory pages are mapped to host memory, the guest may access these guest memory pages. Accordingly, multiple page faults may be avoided because when the guest accesses these guest memory pages, they are already backed by host memory. Additionally, the guest may provide the hypervisor with a batch of guest memory pages for allocation and the hypervisor may perform this allocation with a single exit to the hypervisor rather than multiple exits (e.g., one exit per guest memory page).

As further discussed in the present disclosure, techniques to speed up memory allocation for a guest are provided. Unless specifically stated otherwise, as apparent from the following discussion, it is appreciated that throughout the description, discussions utilizing terms such as "determining," "sending," "reading," "receiving," "transmitting," "providing," "executing," "storing," "allocating," "identifying," "mapping," "identifying," "exposing," "transferring," "initializing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
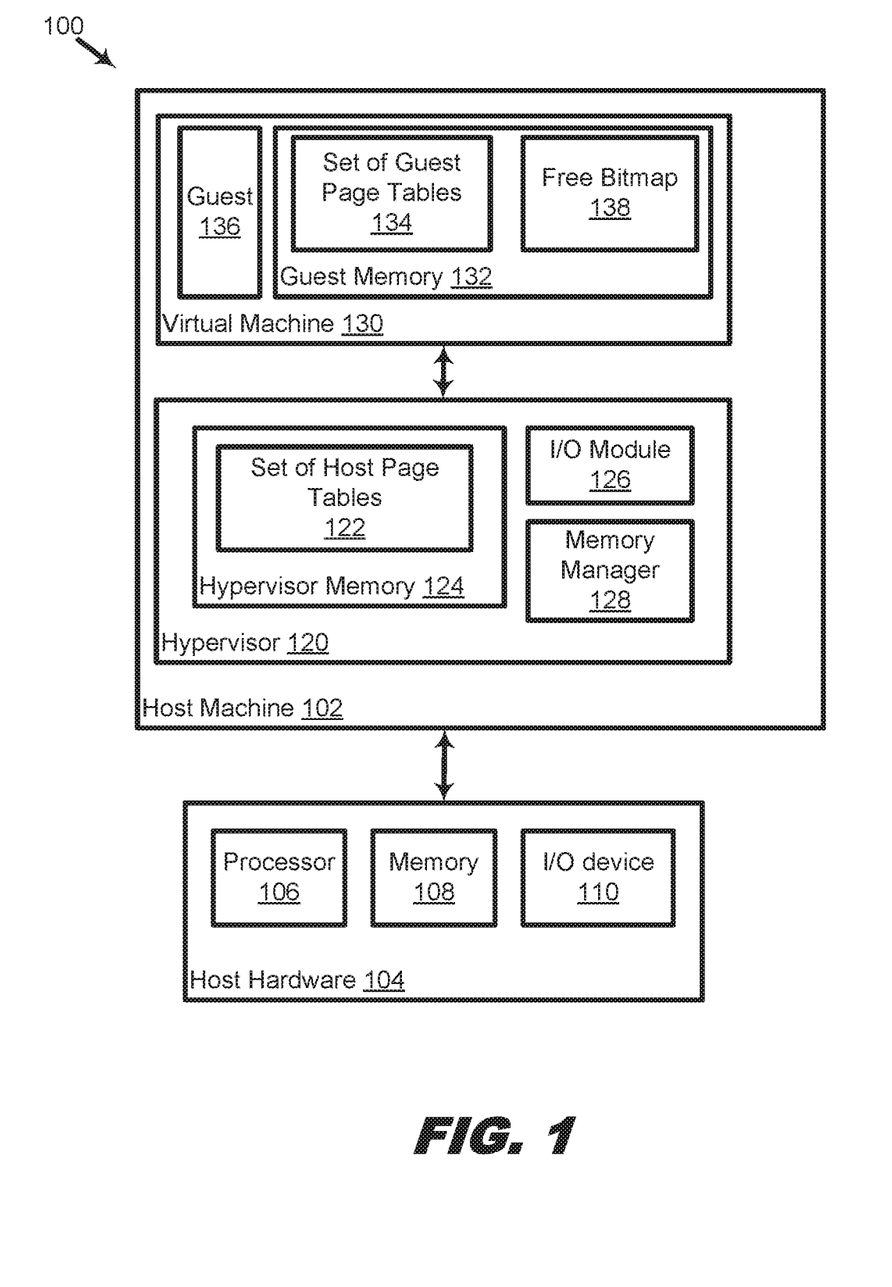
FIG. 1 is a block diagram illustrating an example system for allocating guest memory.

FIG. 1 is a block diagram illustrating an example system 100 for allocating guest memory. System 100 includes a host machine 102 coupled to hardware 104. Host machine 102 may include a personal computer (PC), tablet PC, rack mount computer, cellular telephone, web appliance, server, network router, switch or bridge, or any machine capable of executing a set of instructions (sequential or otherwise) that specify actions to be taken by that machine. Further, while a single host machine is illustrated, the term "machine" shall also be taken to include any collection of machines that individually or jointly execute a set (or multiple sets) of instructions to perform any one or more of the methodologies discussed herein. For example, a collection of machines may be communicatively coupled via one or more network devices and/or transport media.

Host machine 102 is coupled to host hardware 104. Host hardware 104 includes physical elements such as a processor 106 and a memory 108. In some examples, more than one of each of these hardware elements may be included. For example, host hardware 104 may include a plurality of processors coupled to various types of memory and host devices. The term "processor" may be also be used to refer to a "physical processor" or "central processing unit (CPU)." Processor 106 is structured to include one or more general-purpose processing devices such as a microprocessor, and the like. More particularly, processor 106 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some examples, processor 106 is structured to include one or more special-purpose processing devices such as an application specific integrated circuit (ASIC), a field programmable gate array (FPGA), a digital signal processor (DSP), a network processor, and so forth. One or more processors 106 may execute instructions for performing the operations, steps, and/or actions discussed herein.

Memory 108 included in host hardware 104 is structured to include at least one computer-readable storage medium on which is stored one or more sets of instructions (e.g., software) embodying any one or more of the methodologies or functions described herein. Memory 108 may be structured to include one or more of a read-only memory (ROM), flash memory, dynamic random access memory (DRAM) such as synchronous DRAM (SDRAM), double data rate (DDR SDRAM), or DRAM (RDRAM), and so forth), static memory (e.g., flash memory, static random access memory (SRAM), and so forth), and a data storage device (e.g., a hard disk drive (HDD), solid state drive (SSD), and so forth). Accordingly, any of the operations, steps, and/or actions of the methods described herein may be implemented using corresponding machine-readable instructions stored on or in a non-transitory machine-readable medium that are executable by processor 106.

Processor 106 and memory 108 may be communicatively coupled via one or more buses (e.g., a PCI bus) and/or integrated into a motherboard of host machine 102. Host hardware 104 may include other input/output (I/O) devices 110, such as a video display unit (e.g., a liquid crystal display (LCD) monitor), alphanumeric input device (e.g., a keyboard), cursor control device (e.g., a mouse), signal generation device (e.g., a speaker), wireless adapter card, audio/sound card, graphics card, storage adapter, and/or other hardware device.

Host machine 102 is structured to include a hypervisor 120, which may include a virtual machine monitor and/or virtual machine manager. Hypervisor 120 is structured with executable instructions that are stored in memory 108 and executed by processor 106 to provide one or more virtual machines. In some examples, hypervisor 120 is structured to run on top of an OS and/or kernel. In other examples, hypervisor 120 is run directly on host hardware 104 without the use of a separate OS or kernel.

System 100 includes a virtual machine 130 that is provided by hypervisor 120. Hypervisor 120 is structured to provide virtual machine 130 by virtualizing at least a portion of host hardware 104. Hypervisor 120 may provide virtual machine 130 by performing a hardware emulation, full virtualization, para-virtualization, and/or OS-level virtualization corresponding to host machine 102. Hypervisor 120 manages system resources, including providing access of guests (e.g., guest applications such as OSs, kernels, user applications, and so forth) of virtual machine 130 to host hardware 104, such as processor 106 and memory 108. Although one virtual machine is illustrated as running on host machine 102, hypervisor 120 may provide a plurality of virtual machines. Other virtual machines may include components similar to those illustrated with respect to virtual machine 130, such as a guest, guest memory, and so forth.

Hypervisor 120 may allow multiple OSs, called guests or guest OSs, to run on the same physical system by offering virtualized hardware to the guest. Host machine 102 may run multiple OSs, concurrently and in isolation from other programs on a single system. A guest 136 running on virtual machine 130 may be different from the host OS running on host machine 102. The host OS or guest 136 may include, for example, RED HAT ENTERPRISE LINUX, FEDORA, WINDOWS, OS X, IOS, ANDROID, or any other OS. In some examples, virtual machine 130 may be structured to include a plurality of guest OSs. Trademarks are the property of their respective owners.

Virtual machine 130 is structured with a guest memory 132. Guest memory 132 is a memory resource that is provided by hypervisor 120. Hypervisor 120 is structured to provide guest memory 132 by allocating a portion of memory 108 using a set of host page tables 122 stored in a hypervisor memory 124. Memory 108 is divided into host-physical memory addresses that are portioned into fixed-length blocks of memory that compose memory pages. Set of host page tables 122 provides entries corresponding to the memory pages that are included in one or more tables. Set of host page tables 122 uses the entries to map one or more ranges of the host-physical memory addresses into one or more guest-physical address ranges that are assigned to virtual machine 130 as guest memory 132. Host-physical memory is hardware memory 108.

Guest memory 132 is structured with a set of guest page tables 134 that provides another layer of memory address mappings. Set of guest page tables 134 maps one or more ranges of guest-virtual memory addresses to the guest-physical addresses provided by set of host page tables 122, which may be stored in hypervisor memory 124. Accordingly, the guest-virtual memory addresses are mapped to guest-physical memory addresses by set of guest page tables 134, and the guest-physical memory addresses are mapped to the host-physical memory addresses by set of host page tables 122. Thus, memory pages in guest memory 132 may include one or more guest-virtual memory addresses that map to host-physical memory addresses by way of set of guest page tables 134 and set of host page tables 122.

Virtual machine 130 includes at least one guest 136, which may include a kernel, OS, and/or other application running on the virtual machine. A guest kernel of virtual machine 130 may provide core computing functionality, such as allocating memory pages of guest memory 132 to processes and/or threads, communicating I/O to and from virtual devices, managing a file system, handling interrupts, scheduling and running processes to execute instructions of computing tasks by a virtual processor, providing an interface between devices and software applications, and/or providing other important computing features. Guest 136 may run on top of the kernel to provide additional interfaces and functionality on virtual machine 130 beyond those offered by the kernel.

Guest 136 (e.g., one or more guest kernels, guest OSs, and/or other applications) running on the virtual machine may access the guest-virtual memory addresses provided by the guest memory 132 to read, write, and/or execute data. The guest-virtual memory addresses are translated to host-physical memory addresses using page table mappings stored in set of guest page tables 134 and set of host page tables 122. Accordingly, guest 136 is provided read, write, and/or execute access to data stored in memory 108.

Memory pages may be classified as dirty pages or free pages based on their current usage or non-usage status. Dirty pages include memory pages that have been allocated to one or more guests of the virtual machine and modified to store data. For example, memory pages may be allocated to store instructions executable by a process running on the virtual machine. In another example, memory pages may be allocated to store other types of data for guests of the virtual machine, such as media files, databases, program files, and/or any other type of data. These memory pages that are allocated and modified for storing data are classified as dirty memory pages.

Free memory pages are memory pages that are not in-use and/or are available for allocation by the virtual machine. Free memory pages may include pages that have not been previously allocated as well as memory pages that have been previously allocated but have since been de-allocated and/or freed. Memory pages may be freed when the data stored on the memory pages is no longer used and the memory pages are therefore no longer active. Accordingly, free memory pages may be inactive memory pages, clean memory pages, and other memory pages that are not currently in use on the virtual machine.

Guest memory 132 is structured with a free bitmap 138 that maintains status indicators corresponding to the memory pages in guest memory 132. Free bitmap 138 is structured to store a plurality of bits, where each bit has a zero or a one value corresponding to a memory page in guest memory 132. Each bit indicates whether the memory page corresponding to the bit is in-use or free. Guest 136 may update free bitmap 138 to track an up-to-date status of each memory page. Accordingly, free bitmap 138 may be updated as memory pages are allocated and modified to indicate that the memory pages are in-use. Similarly, as memory pages are de-allocated guest 136 may update free bitmap 138 to indicate that the memory pages are free memory pages that are available for allocation.

Guest 136 updates a status of its memory pages using free bitmap 138. In some examples, before guest 136 uses a memory page, guest 136 may clear a bit in free bitmap 138 corresponding to the memory page. Guest 136 may "free" a memory page and indicate that it is free by setting the memory page's corresponding bit (e.g., to 1) in free bitmap 138.

Additionally, hypervisor 120 may deallocate and unmap some of the guest memory pages that were previously allocated to guest 136 and backed up by host memory 108.

Hypervisor 120 may do so because the total amount of the free host memory is low (e.g., below a threshold). Accordingly, hypervisor 120 may reclaim some of this memory back and use it for other purposes. If guest 136 attempts to access an unmapped guest memory page, a page fault may occur resulting in an exit to hypervisor 120. The handling of a page fault and an exit to hypervisor 120 may be time consuming, and thus it may be desirable to reduce them. The present disclosure provides techniques to reduce the number of exits to hypervisor 120.

In the example illustrated in FIG. 1, hypervisor 120 includes an I/O module 126 and a memory manager 128. Guest 136 and I/O module 126 may send communications to and receive communications from each other. In an example, guest 136 sends a request to allocate a plurality of guest memory pages for guest 136 to hypervisor 120. I/O module 126 may receive the memory allocation request and pass it along to memory manager 128 for processing. In some examples, in response to the memory allocation request from guest 136, memory manager 128 identifies a plurality of free host memory pages and allocates this plurality for guest 136. Memory manager 128 maps the plurality of guest memory pages to the plurality of host memory pages. After this mapping, the plurality of guest memory pages corresponds to the plurality of host memory pages. A guest memory page corresponds to a host memory page if the guest memory page maps to the host memory page, and vice versa.

Figure 2:
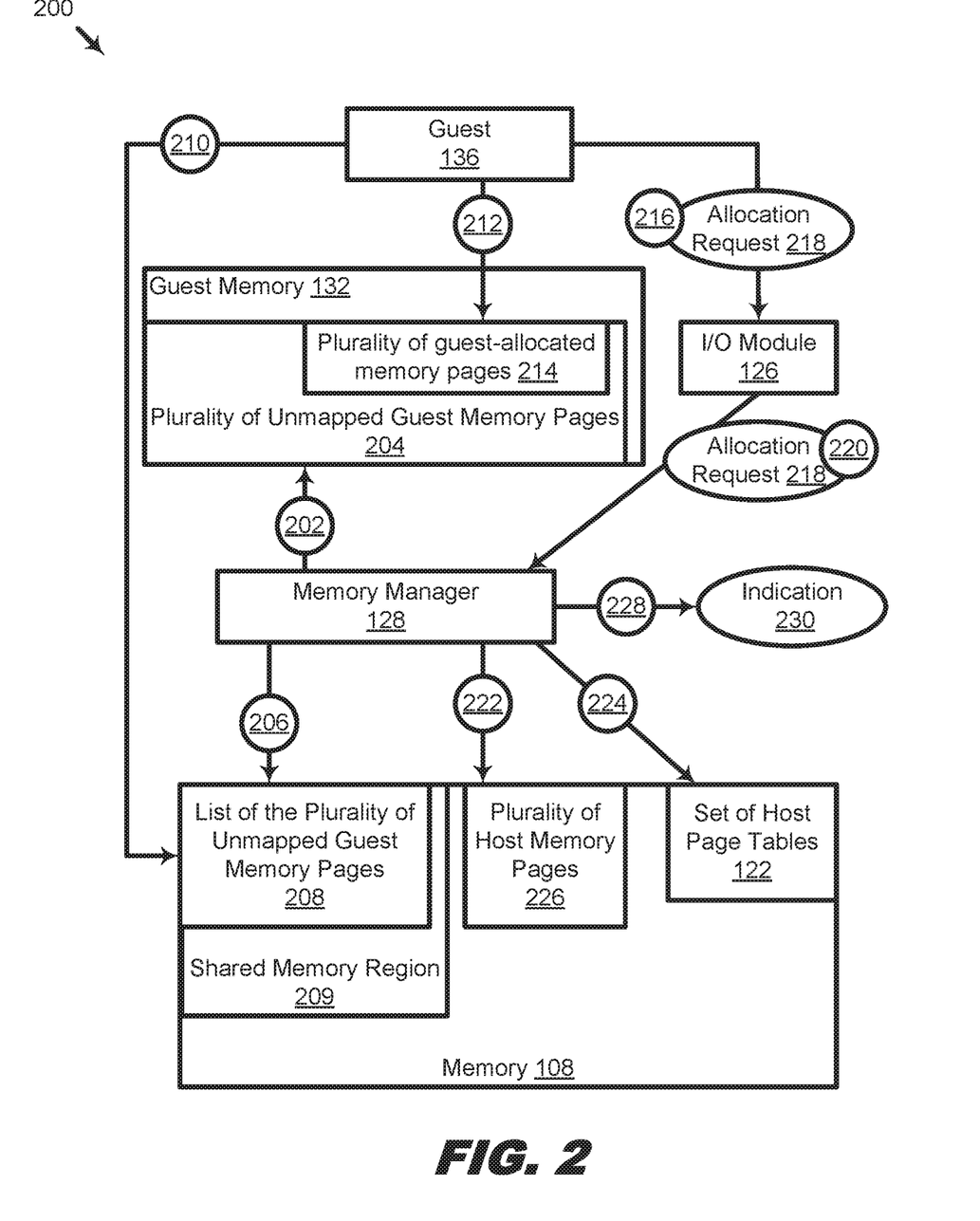
FIG. 2 is an example process flow for managing memory allocation for a guest.

FIG. 2 is an example process flow 200 for managing memory allocation for a guest. At action 202, memory manager 128 identifies a plurality of unmapped guest memory pages 204 that if accessed by guest 136 triggers a page fault. In an example, a guest access to a guest memory page causes a page fault if the guest memory page is not mapped to a host memory page. Memory manager 128 allocates guest memory 132 to guest 136 and knows which guest memory pages are mapped to host memory 108 and which are not. For example, memory manager 128 may map a guest memory page to host memory 108 and at some later point in time, de-allocate and unmap this guest memory page because the total amount of the free host memory is low (e.g., below a threshold). It should be understood that memory manager 128 may unmap a guest memory page for other reasons. Accordingly, memory manager 128 may reclaim some of this memory back and use it for other purposes. In an example, memory manager 128 maintains list of the plurality of unmapped guest memory pages 208 and updates it each time a guest memory page is unmapped or write protected, or is allocated and mapped to host memory.

At action 206, memory manager 128 exposes a list of the plurality of unmapped guest memory pages 208 to guest 136. In an example, each guest memory page included in list of the plurality of unmapped guest memory pages 208 would cause a page fault if accessed by guest 136, thus causing an exit to hypervisor 120. List of the plurality of unmapped guest memory pages 208 may specify guest memory addresses at which plurality of unmapped guest memory pages 204 is stored. In an example, memory manager 128 exposes list of the plurality of unmapped guest memory pages 208 by storing the list into a shared memory region 209. Shared memory region 209 is shared between guest 136 and hypervisor 120 such that each may store data in and read data from it. In some examples, list of the plurality of unmapped guest memory pages 208 may be stored in a data structure located in shared memory region 209.

An attempted access to a guest memory page may cause a page fault for a variety of reasons. In an example, guest 136 may attempt to read a memory page that is not present in main memory. In this example, an exit to hypervisor 120 may occur, and hypervisor 120 may detect the attempted read, allocate some host physical memory (e.g., random access memory (RAM) memory) corresponding to the attempted read, map guest memory pages to this allocated host physical memory, and perform the read on behalf of the guest. In another example, guest 136 may attempt to write to a deduplicated memory page, resulting in a page fault. In this example, an exit to hypervisor 120 may occur and hypervisor 120 may detect the attempted write to the deduplicated memory page, copy the deduplicated memory page, and perform the write to the copy on behalf of the guest. In another example, guest 136 may attempt to write to a write-protected memory page. In this example, an exit to hypervisor 120 may occur, and hypervisor 120 may detect the attempted write and perform the write on behalf of guest 136. Guest 136 may have permission to write to the write-protected memory page, but hypervisor 120 may have write-protected it to detect modifications to this memory page and perform the write on behalf of guest 136.

At action 210, guest 136 receives list of the plurality of unmapped guest memory pages 208 by reading it from shared memory region 209. Accordingly, guest 136 knows which guest memory pages would cause a page fault if accessed by the guest. If guest 136 desires to allocate and use a set of guest memory pages, it may be desirable for guest 136 to allocate free guest memory pages that are part of list of the plurality of unmapped guest memory pages 208. Doing so may save time because these free guest memory pages of list of the plurality of unmapped guest memory pages 208 have not already been mapped to guest 136 and would allow these unmapped memory pages to be used by guest 136. In this way, hypervisor 120's knowledge of particular memory pages that if accessed by the guest would cause a page fault and thus an exit to hypervisor 120, may be leveraged to speed up the allocation of guest memory. Guest 136 may detect that multiple free pages are to be allocated and/or used, for example, to a new program. At action 212, guest 136 allocates a plurality of guest memory pages included in guest memory 132, which may be referred to as a plurality of guest-allocated memory pages 214. Plurality of guest-allocated memory pages 214 may be a plurality of free guest memory pages, as indicated by free bitmap 138, and may be part of list of the plurality of unmapped guest memory pages 208.

Guest 136 may allocate a guest memory page by selecting a guest memory address for the guest memory page from guest memory 132 and inserting the guest memory address into set of guest page tables 134. In some examples, guest 136 selects the free guest memory pages to allocate based on selecting them from plurality of unmapped guest memory pages 208. Guest 136 may build a list of the guest-allocated memory pages. For example, guest 136 may detect that an access to a memory page will trigger a page fault, allocate this guest memory page, and add it to plurality of guest-allocated memory pages 214. Before guest 136 accesses the plurality of guest-allocated memory pages 214, guest 136 may send I/O module 126 a request to allocate the guest-allocated memory pages 214 and thus have them backed by host physical memory. Accordingly, access by guest 136 to plurality of guest-allocated memory pages 214 at a later point in time may be backed by host memory and not result in a page fault and an exit to hypervisor 120.

At action 216, guest 136 sends an allocation request 218 to hypervisor 120, where allocation request 218 is a request to map plurality of guest-allocated memory pages 214 to host physical memory. Allocation request 218 may include the guest addresses corresponding to the guest memory pages that guest 136 desires to use. When a program or a subsystem in guest 136 allocates a guest memory page, the guest usually does so with the intention of using the page soon (e.g., reading from or write to the guest memory page). Guest 136 may provide plurality of guest-allocated memory pages 214 to hypervisor 120, which may use this information to optimize the memory allocation for guest 136. Accordingly, if hypervisor 120 receives allocation request 218, the hypervisor may use this request as an indication that guest 136 will soon access some guest memory pages that are not backed by host physical memory. Additionally, if hypervisor 120 receives one request from guest 136 to allocate a single guest memory page, it may be more likely than not that additional guest memory page allocation requests will arrive soon. An example of the present disclosure provides for multiple guest memory pages to be allocated and backed by host physical memory in response to a single allocation request that causes a single exit to hypervisor 120. In this example, multiple page faults and exits to hypervisor 120 may be avoided.

Guest 136 may send allocation request 218 to hypervisor 120 before the guest accesses plurality of guest-allocated memory pages 214. Accordingly, guest 136 may provide hypervisor 120 with information regarding which guest memory pages the guest 136 will access before it actually accesses those guest memory pages. If hypervisor 120 receives list of the plurality of guest-allocated memory pages 214, hypervisor 120 may ensure that plurality of guest-allocated memory pages 214 is backed by host memory pages of host memory 108 before the guest actually accesses the guest-allocated memory pages 214. Accordingly, if guest 136 accesses a guest memory page of plurality of guest-allocated memory pages 214 after hypervisor 120 has backed it up by a host memory page, a page fault may be avoided, thus reducing the number of page faults and exits to hypervisor 120.

I/O module 126 receives allocation request 218 from guest 136. Allocation request 218 may cause an exit to hypervisor 120. At action 220, I/O module 126 may pass allocation request 218 along to memory manager 128. In response to allocation request 218, memory manager 128 may perform actions 222 and 224. At action 222, memory manager 128 allocates a plurality of host memory pages 226 to back up plurality of guest-allocated memory pages 214. In some examples, memory manager 128 allocates plurality of host memory pages 226 by identifying a set of free host memory pages in main memory and initializing the set of free host memory pages with data in accordance with an access by the guest. The set of free host memory pages may be plurality of host memory pages 226. In an example, memory manager 128 allocates plurality of host memory pages 226 by locating an unused chunk of host memory 108 and then initializing it with the correct data. Memory manager 128 may retrieve the correct data in a variety of ways. In an example, memory manager 128 retrieves the correct data by copying it from another location of guest memory 132, host memory 108, and/or hard disk. By allocating multiple host memory pages within the context of one exit to hypervisor 120, memory may be more efficiently allocated for guest 136. For example, memory manager 128 may allocate 512 4 KB memory pages with one exit to hypervisor 120, rather than several exits.

At action 224, memory manager 128 maps the plurality of guest-allocated memory pages 214 to plurality of host memory pages 226 in host physical memory. Memory manager 128 may implement this mapping by, for example, setting up entries in set of host page tables 122 to allow the guest 136 access to guest-allocated memory pages 214. In an example, memory manager 128 writes a page table entry into a host page table of set of host page tables 122. Processor 106 may make this page table entry writable and insert the host memory address to which a guest memory page is mapped into the page table entry. Accordingly, memory manager 128 that the plurality of guest-allocated memory pages 214 included in allocation request 218 is backed by host physical memory. In this way, memory manager 128 may map guest memory addresses to actual physical memory.

In some examples, guest 136 provides in allocation request 218 the guest's access permissions to one or more of the plurality of guest-allocated memory pages 214. In this example, memory manager 128 maps plurality of guest-allocated memory pages 214 to allow the guest the specific type of access requested. In some examples, for each guest memory page of the plurality of guest-allocated memory pages 214, memory manager 128 inserts a page table entry into a host page table. Each page table entry may map a guest memory address at which a respective guest memory page is stored to a host memory address at which a host memory page of plurality of host memory pages 226 is stored. Additionally, the respective page table entry may include the respective access permissions of the guest to the respective guest memory page.

After memory manager 128 has finished these mappings, memory manager 128 has completed allocation request 218. At action 228, memory manager 128 sends an indication 230 to guest 136, where indication 230 in an indication that memory manager 128 has completed allocation request 218 and thus, the plurality of guest-allocated memory pages 214 is backed by host physical memory. Additionally, after allocation request 218 has been completed, memory manager 128 transfers control of a virtual processor allocated to guest 136 back to the guest.

After guest 136 sends allocation request 218 to hypervisor 120, guest 136 may wait for indication 230 before accessing any of plurality of guest-allocated memory pages 214. In this way, guest 136 may avoid an access to memory that causes a page fault. After guest 136 receives indication 230, guest may access plurality of guest-allocated memory pages 214 in accordance with the guest's desired access (e.g., a read from a guest memory page or a write to a guest memory page).

A problem may arise if a system includes multiple processors because memory allocation may be complicated and time consuming. This problem may be solved by batching. In batching, if a processor keeps a set of free pages in a local queue or buffer, when the free set is empty, the processor will grab another entire batch all at once from the system-wide allocator, which may be processor 106. When memory pages are freed, if a local set of free memory pages grows too large, processor 106 may free a batch worth of memory pages into the system all at once to minimize lock contention with the other processors. Accordingly, memory may be allocated and freed efficiently in the system.

In an example, if guest 136 is a LINUX OS, free pages may be maintained in a buddy allocated data structure. In this example, the kswapd daemon may move the free guest memory pages into per-processor pools. From these pools, free memory pages may be allocated and used. Guest 136 may recognize the high likelihood that memory pages grabbed from the local free pool or general free pages will be used soon. Each pool may include a set of free memory pages that may be allocated. In an example, guest 136 grabs all the memory pages in a pool for allocation purposes. For example, plurality of guest-allocated memory pages 214 may be memory pages included in a local free pool, and guest 136 may grab plurality of guest-allocated memory pages 214 even if the guest does not plan on using the entire plurality at the moment. As time goes on, guest 136 may hand out memory pages from the grabbed set to different allocating subsystems and programs inside guest 136. Guest 136 may allocate guest memory pages by grabbing them from the pool of free pages.

As discussed above and further emphasized here, FIGS. 1 and 2 are merely examples, which should not unduly limit the scope of the claims.

Figure 3:
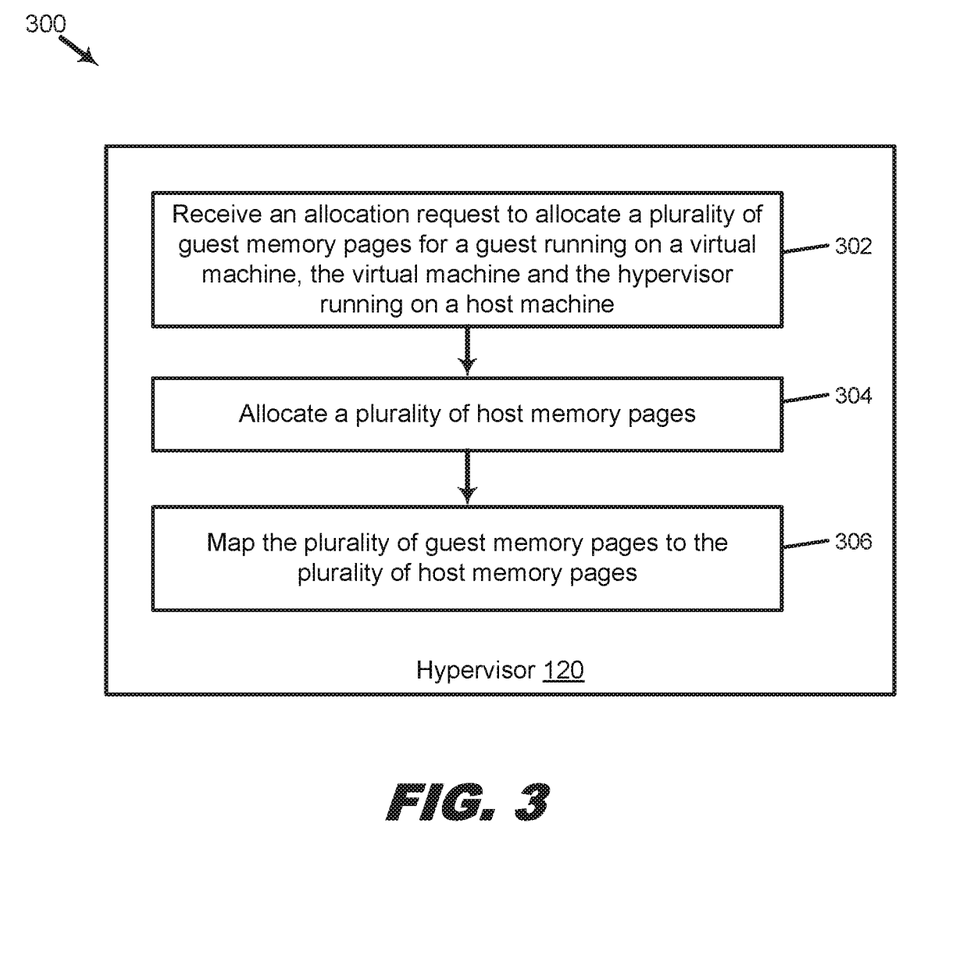
FIG. 3 is a flowchart illustrating an example method for allocating memory pages for a guest.

FIG. 3 is a flowchart illustrating an example method 300 for allocating memory pages for a guest. Method 300 is not meant to be limiting and may be used in other applications. Method 300 may be performed by processing logic that may include hardware (e.g., circuitry, dedicated logic, programmable logic and microcode), software (such as instructions run on a computer system, specialized hardware, dedicated machine, or processing device), firmware, or a combination thereof. In some examples, method 300 is performed by system 100 illustrated in FIG. 1. For example, blocks of method 300 may be performed on host machine 102, which may be a client or server computer. In some examples, the order of the actions described below may also be performed according to alternative orderings. In yet other examples, additional actions may be added and actions that are described may be removed.

Method 300 includes blocks 302, 304, and 306. In block 302, hypervisor 120 receives allocation request 218 to allocate a plurality of guest memory pages for guest 136 running on virtual machine 130, the virtual machine and the hypervisor running on host machine 102. In response to allocation request 218, hypervisor 120 may execute blocks 304 and 306. In block 304, hypervisor 120 allocates plurality of host memory pages 226. In block 306, hypervisor 120 maps the plurality of guest memory pages (e.g., plurality of guest-allocated memory pages 214) to plurality of host memory pages 226.

It is understood that additional blocks may be inserted before, during, or after blocks 302-306 discussed above. It is also understood that one or more of the blocks of method 300 described herein may be omitted, combined, or performed in a different sequence as desired.

Figure 4:
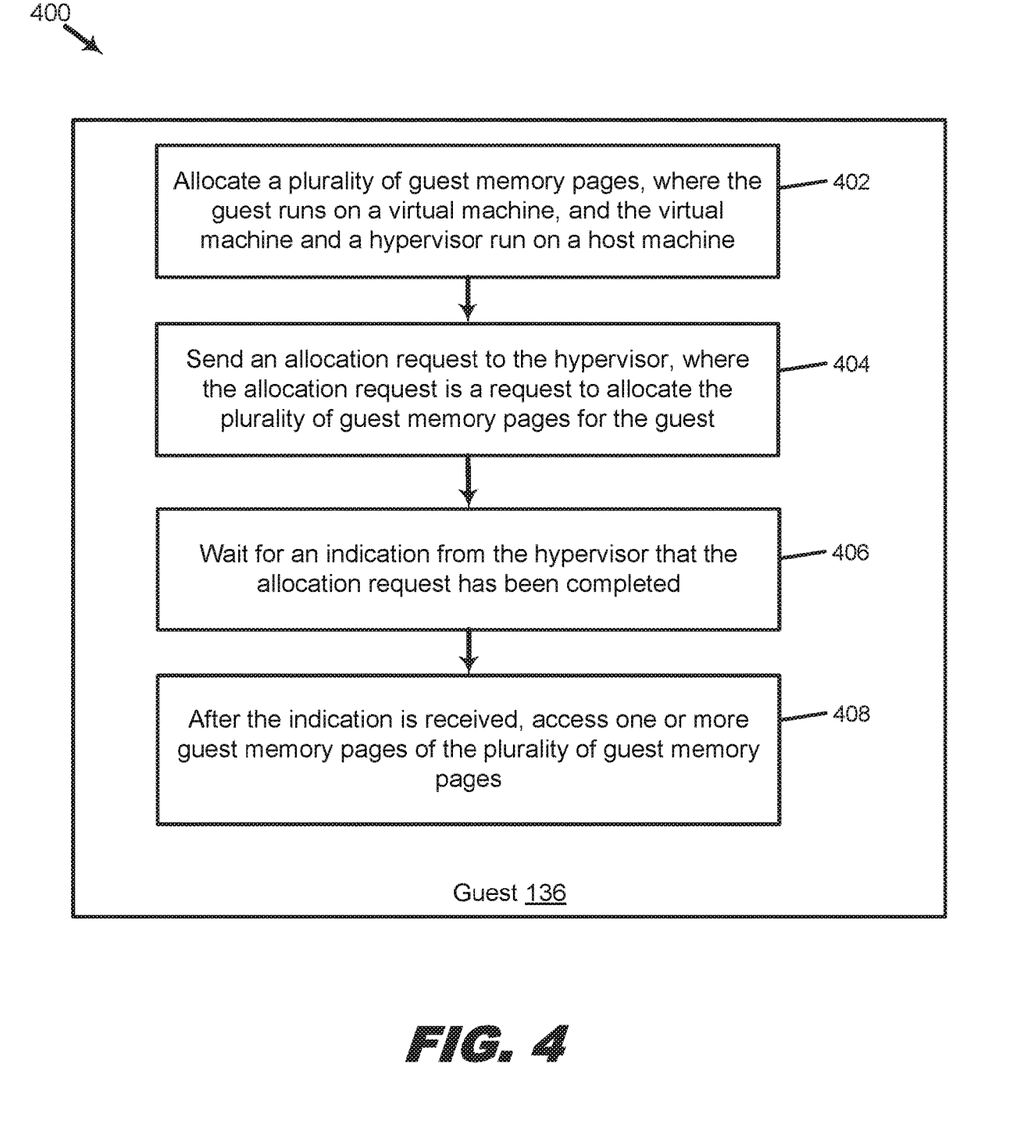
FIG. 4 is a flowchart illustrating an example method for allocating memory pages for a guest.

FIG. 4 is a flowchart illustrating an example method 400 for allocating memory pages for a guest. Method 400 is not meant to be limiting and may be used in other applications. Method 400 may be performed by processing logic that may include hardware (e.g., circuitry, dedicated logic, programmable logic and microcode), software (such as instructions run on a computer system, specialized hardware, dedicated machine, or processing device), firmware, or a combination thereof. In some examples, method 400 is performed by system 100 illustrated in FIG. 1. For example, blocks of method 400 may be performed on host machine 102, which may be a client or server computer. In some examples, the order of the actions described below may also be performed according to alternative orderings. In yet other examples, additional actions may be added and actions that are described may be removed.

Method 400 includes blocks 402, 404, 406, and 408. In block 404, guest 136 allocates a plurality of guest memory pages, where guest 136 runs on virtual machine 130, and virtual machine 130 and hypervisor 120 running on host machine 102. In block 404, guest 136 sends allocation request 218 to hypervisor 120, where allocation request 218 is a request to allocate the plurality of guest memory pages for guest 136. In block 406, guest 136 waits for indication 230 that allocation request 218 has been completed from hypervisor 120. In block 408, after indication 230 is received, guest 136 accesses one or more guest memory pages of the plurality of guest memory pages.

It is understood that additional blocks may be inserted before, during, or after blocks 402-408 discussed above. It is also understood that one or more of the blocks of method 300 described herein may be omitted, combined, or performed in a different sequence as desired.

Figure 5:
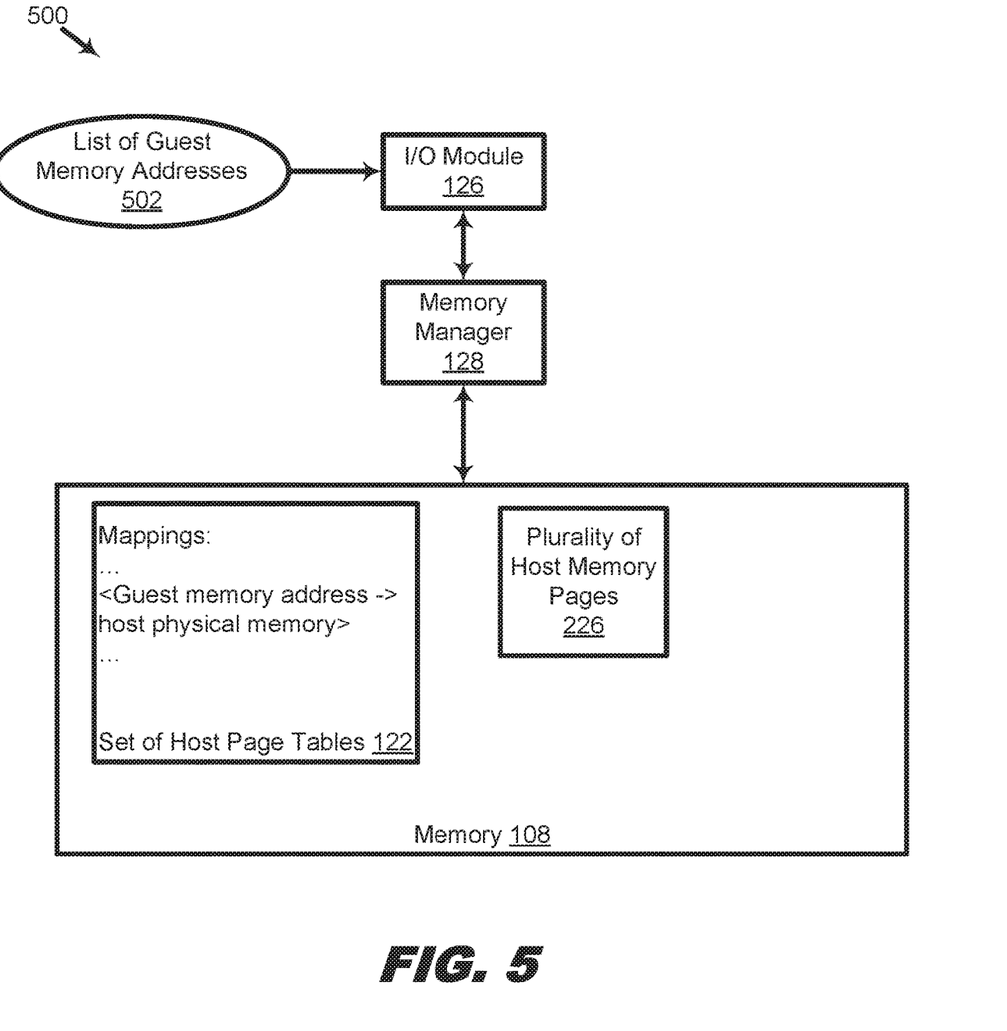
FIG. 5 is an example block diagram illustrating a system for allocating memory pages for a guest.

FIG. 5 is an example block diagram 500 illustrating a system for allocating memory pages for a guest. In FIG. 5, I/O module 126 receives a list of guest memory addresses 502 from guest 136 running on virtual machine 130. The guest memory addresses included in list of guest memory addresses 502 is allocated to guest 136. Additionally, set of host page tables 122 stores a plurality of page table entries, where each page table entry stores one or more mappings of a guest memory address to host physical memory. In an example, a page table entry may store a plurality of mappings. Memory manager 128 manages set of host page tables 122 stored in memory 108. In some examples, memory manager 128 allocates plurality of host memory pages 226 and maps the guest memory addresses included in list of guest memory addresses 502 to plurality of host memory pages 226. Plurality of host memory pages 226 is part of the host memory.

Figure 6:
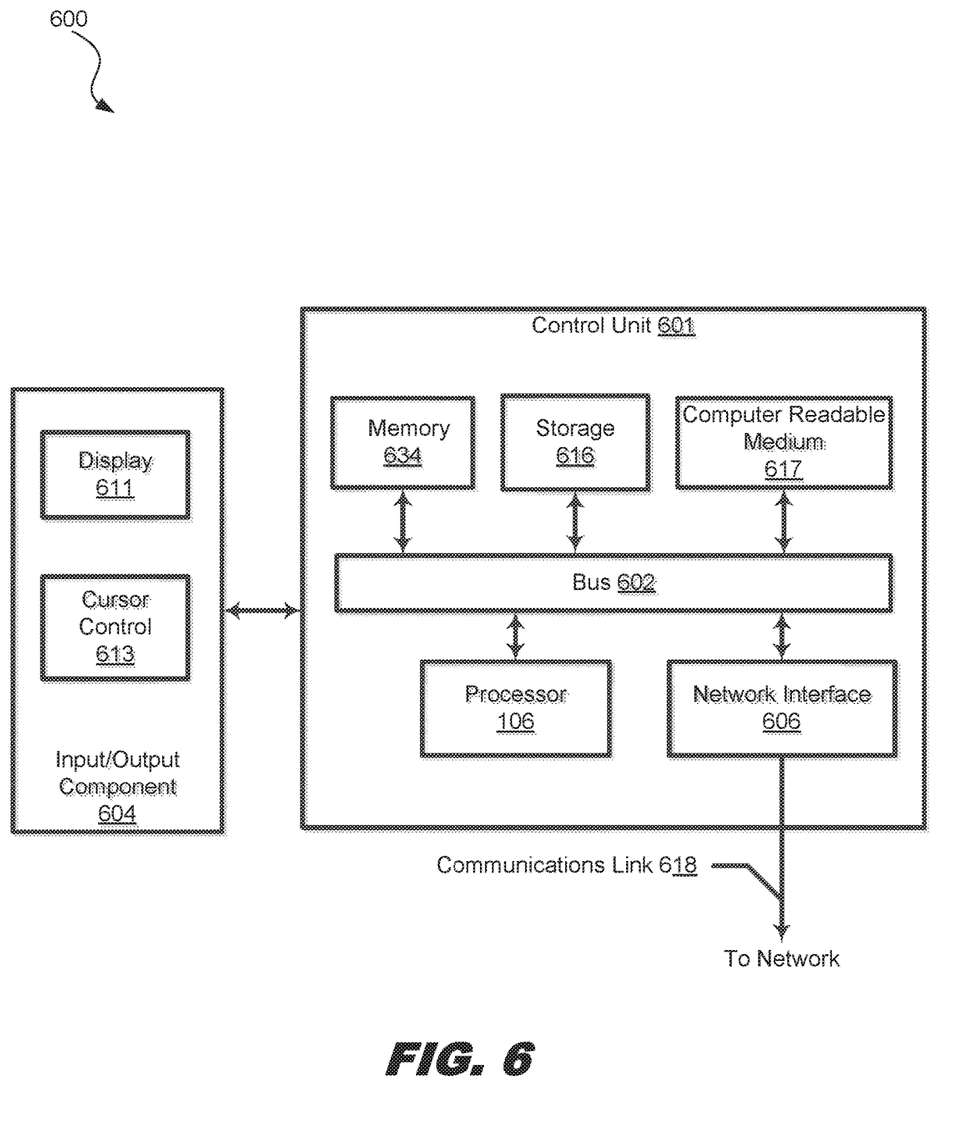
FIG. 6 is a block diagram of an electronic system suitable for implementing one or more examples of the present disclosure.

FIG. 6 is a block diagram of a computer system 600 suitable for implementing one or more examples of the present disclosure. In various implementations, computer system 600 corresponds to host machine 102, which may include a client or a server computing device. The client or server computing device may include a plurality of processors. The client or server computing device may additionally include one or more storage devices each selected from a group including floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 600 includes a bus 602 or other communication mechanism for communicating information data, signals, and information between various components of computer system 600. Components include an I/O component 604 that processes a user action, such as selecting keys from a keypad/keyboard, selecting one or more buttons or links, etc., and sends a corresponding signal to bus 602. In an example, a user may interact with a host computing system using I/O component 604 and cause virtual machine 130 to launch. Additionally, the user launch a new program via I/O component 604, which causes guest 136 to send allocation request 218. I/O component 604 may also include an output component such as a display 611, and an input control such as a cursor control 613 (such as a keyboard, keypad, mouse, etc.).

A transceiver or network interface 606 transmits and receives signals between computer system 600 and other devices via a communications link 618 to a network. In an examples, the transmission is wireless, although other transmission mediums and methods may also be suitable. Processor 106, which may be a micro-controller, digital signal processor (DSP), or other processing component, processes these various signals, such as for display on computer system 600 or transmission to other devices via communications link 618. Processor 106 may also control transmission of information, such as cookies or IP addresses, to other devices.

Components of computer system 600 also include a system memory component 634 (e.g., RAM), a static storage component 616 (e.g., ROM), and/or a disk drive 617. System memory component 634 may include memory 634. Computer system 600 performs specific operations by processor 106 and other components by executing one or more sequences of instructions contained in system memory component 634. Logic may be encoded in a computer readable medium, which may refer to any medium that participates in providing instructions to processor 106 for execution. Such a medium may take many forms, including but not limited to, non-volatile media, volatile media, and transmission media.

In various implementations, non-volatile media includes optical, or magnetic disks, or solid-state drives, volatile media includes dynamic memory, such as system memory component 634, and transmission media includes coaxial cables, copper wire, and fiber optics, including wires that include bus 602. In an example, the logic is encoded in non-transitory computer readable medium. In an example, transmission media may take the form of acoustic or light waves, such as those generated during radio wave, optical, and infrared data communications. Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various examples, execution of instruction sequences (e.g., method 300 and/or method 400) to practice the present disclosure may be performed by computer system 600. In various other examples, a plurality of computer systems 600 coupled by communication links 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various examples provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps or actions described herein may be changed, combined into composite steps or composite actions, and/or separated into sub-steps or sub-actions to provide features described herein.

The foregoing disclosure is not intended to limit the present disclosure to the precise forms or particular fields of use disclosed. As such, it is contemplated that various alternate examples and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method of allocating memory pages for a guest, comprising:
    identifying, by a hypervisor, a plurality of unmapped guest memory pages that are not mapped to a physical host memory page and that if accessed by a guest running on a virtual machine triggers a page fault, the virtual machine and the hypervisor running on a host machine;
    exposing, by the hypervisor, a list of the plurality of unmapped guest memory pages to the guest by storing the list of the plurality of unmapped guest memory pages in a data structure located in a shared memory region, wherein both the guest and the hypervisor may store data in and read data from the shared memory region;
    with the guest, reading the list of the plurality of unmapped guest memory pages from the shared memory region;
    with the guest, allocating a plurality of guest memory pages in guest memory;
    with the guest, determining that at least one of the plurality of guest memory pages is on the list of unmapped guest memory pages;
    with the guest, in response to determining that at least one of the plurality of guest memory pages is on the list of unmapped guest memory pages, sending a request to the hypervisor;
    receiving, by the hypervisor, the request from the guest, the request being to map a plurality of guest-allocated memory pages to host physical memory, the plurality of guest-allocated memory pages being a subset of the plurality of unmapped guest memory pages and being specified in a set of guest page tables by the guest as being allocated to the guest, wherein the request to map the plurality of guest-allocated memory pages to host physical memory is received before an attempted access by the guest to the plurality of guest-allocated memory pages; and
    in response to the request:
        allocating, by the hypervisor, a plurality of host memory pages for the guest;
        mapping the plurality of guest-allocated memory pages to the plurality of host memory pages, wherein mapping the plurality of guest-allocated memory pages includes for each guest memory page of the plurality of guest-allocated memory pages, inserting a page table entry into a host page table, wherein each page table entry maps a guest memory address at which the respective guest-allocated memory page is stored to a host memory address at which a host memory page of the plurality of host memory page is stored, and wherein after the mapping, access by the guest to a guest-allocated memory page of the plurality of guest-allocated memory pages does not cause a page fault; and indicating to the guest that the plurality of guest-allocated memory pages have been mapped to host memory pages before the guest attempts to access one of the plurality of guest-allocated memory pages, wherein the indicating includes updating a bitmap located within guest memory;

updating the list of the plurality of unmapped guest memory pages in accordance with the mapping.

2. The method of claim 1, wherein exposing the list of unmapped guest memory pages includes sending, by the hypervisor, guest addresses at which the list of unmapped guest memory pages is allocated to the guest.

3. The method of claim 1, wherein a memory page of the plurality of unmapped guest memory pages is write protected.

4. The method of claim 1, further comprising:
after mapping the plurality of guest-allocated memory pages, transferring, by the hypervisor, control of a virtual processor allocated to the guest to the guest.

5. The method of claim 1, wherein allocating the plurality of host memory pages includes:
identifying a set of free host memory pages, and
initializing the set of free host memory pages with data in accordance with an access by the guest, the set of free host memory pages being the plurality of host memory pages.

6. The method of claim 1, further including:
receiving, by the hypervisor, access permissions of the guest to one or more of the plurality of guest-allocated memory pages.

7. The method of claim 6, wherein the respective page table entry includes the respective access permissions of the guest to the respective guest memory page.

8. The method of claim 1, wherein the allocating and mapping are in response to a single request that causes a single exit to the hypervisor.

9. The method of claim 1, wherein the identifying includes identifying at least two memory pages of the plurality of unmapped guest memory pages that are not present in main memory, and wherein before the mapping, the at least two memory pages are not mapped to any host memory page of the plurality of host memory pages.

10. The method of claim 1, wherein the host page table does not include an entry including a mapping from a guest memory page of the plurality of unmapped guest memory pages to a host memory page.

11. The method of claim 1, wherein at least one memory page of the plurality of unmapped guest memory pages is not present in main memory.

12. A system for allocating memory pages for a guest, comprising:
one or more hardware processors coupled to a non-transitory memory and configured to read instructions from the non-transitory memory to cause the system to perform operations comprising:

identifying, by a hypervisor, a plurality of unmapped guest memory pages that are not mapped to a physical host memory page and that if accessed by a guest running on a virtual machine triggers a page fault, the virtual machine and the hypervisor running on a host machine;

exposing, by the hypervisor, a list of the plurality of unmapped guest memory pages to the guest by storing the list of the plurality of unmapped guest memory pages in a data structure located in a shared memory region, wherein both the guest and the hypervisor may store data in and read data from the shared memory region;

with the guest, reading the list of the plurality of unmapped guest memory pages from the shared memory region;

with the guest, allocating a plurality of guest memory pages in guest memory;

with the guest, determining that at least one of the plurality of guest memory pages is on the list of unmapped guest memory pages;

with the guest, in response to determining that at least one of the plurality of guest memory pages is on the list of unmapped guest memory pages, sending a request to the hypervisor;

receiving, by the hypervisor, the request from the guest, the request being request from the guest to map a plurality of guest-allocated memory pages to host physical memory, the plurality of guest-allocated memory pages being a subset of the plurality of unmapped guest memory pages and being specified in a set of guest page tables by the guest as being allocated to the guest, wherein the request to map the plurality of guest-allocated memory pages to host physical memory is received before an attempted access by the guest to the plurality of guest-allocated memory pages; and in response to the request:
allocating, by the hypervisor, a plurality of host memory pages for the guest;
mapping the plurality of guest-allocated memory pages to the plurality of host memory pages, wherein mapping the plurality of guest-allocated memory pages includes for each guest memory page of the plurality of guest-allocated memory pages, inserting a page table entry into a host page table, wherein each page table entry maps a guest memory address at which the respective guest-allocated memory page is stored to a host memory address at which a host memory page of the plurality of host memory page is stored, and wherein after the mapping, access by the guest to a guest-allocated memory page of the plurality of guest-allocated memory pages does not cause a page fault; and indicating to the guest that the plurality of guest-allocated memory pages have been mapped to host memory pages before the guest attempts to access one of the plurality of guest-allocated memory pages, wherein the indicating includes updating a bitmap located within guest memory;

updating the list of the plurality of unmapped guest memory pages in accordance with the mapping.

13. The system of claim 12, further comprising:
a hypervisor including the memory manager.

14. The system of claim 13, wherein the guest invokes a hypercall to send the list of guest memory addresses to an I/O module, wherein the hypervisor includes the I/O module.

15. The system of claim 12, wherein the guest sends an allocation request for allocation of the guest memory addresses to the hypervisor.

16. The system of claim 12, wherein the guest allocates the list of guest memory addresses within the guest before the guest sends the allocation request.

17. The system of claim 12, wherein the guest detects that an access to a first memory page will trigger a page fault, allocates, based on the detection, the first memory page, and adds the first memory page to the plurality of guest-allocated memory pages.

18. The system of claim 17, wherein the guest detects that an access to a second memory page will trigger a page fault, allocates, based on the detection, the second memory page, and adds the second memory page to the plurality of guest-allocated memory pages, wherein the guest allocates the first and second memory pages by inserting a first guest memory address of the first memory page and a second guest memory address of the second memory page into a guest page table.

19. A non-transitory machine-readable medium comprising a plurality of machine-readable instructions that when executed by one or more processors are adapted to cause the one or more processors to perform a method comprising:

identifying, by a hypervisor, a plurality of unmapped guest memory pages that are not mapped to a physical host memory page and that if accessed by a guest running on a virtual machine triggers a page fault, the virtual machine and the hypervisor running on a host machine;

exposing, by the hypervisor, a list of the plurality of unmapped guest memory pages to the guest by storing the list of the plurality of unmapped guest memory pages in a data structure located in a shared memory region, wherein both the guest and the hypervisor may store data in and read data from the shared memory region;

with the guest, reading the list of the plurality of unmapped guest memory pages from the shared memory region;

with the guest, allocating a plurality of guest memory pages in guest memory;

with the guest, determining that at least one of the plurality of guest memory pages is on the list of unmapped guest memory pages;

with the guest, in response to determining that at least one of the plurality of guest memory pages is on the list of unmapped guest memory pages, sending a request to the hypervisor;

receiving, by the hypervisor, the request from the guest, the request being to map a plurality of guest-allocated memory pages to host physical memory, the plurality of guest-allocated memory pages being a subset of the plurality of unmapped guest memory pages and being specified in a set of guest page tables by the guest as being allocated to the guest, wherein the request to map the plurality of guest-allocated memory pages to host physical memory is received before an attempted access by the guest to the plurality of guest-allocated memory pages; and in response to the request:

allocating, by the hypervisor, a plurality of host memory pages for the guest;

mapping the plurality of guest memory pages to the plurality of host memory pages, wherein mapping the plurality of guest memory pages includes for each guest memory page of the plurality of guest memory pages, inserting a page table entry into a host page table, wherein each page table entry maps a guest memory address at which the respective guest memory page is stored to a host memory address at which a host memory page of the plurality of host memory page is stored, and wherein after the mapping, access by the guest to a guest memory page of the plurality of guest memory pages does not cause a page fault; and indicating to the guest that the plurality of guest-allocated memory pages have been mapped to host memory pages before the guest attempts to access one of the plurality of guest-allocated memory pages, wherein the indicating includes updating a bitmap located within guest memory;

updating the list of the plurality of unmapped guest memory pages in accordance with the mapping.

\* \* \* \* \*